United States Patent
Boose et al.

(10) Patent No.: US 7,200,271 B2
(45) Date of Patent: Apr. 3, 2007

(54) METHOD, COMPUTER PROGRAM PRODUCT, AND SYSTEM FOR PERFORMING AUTOMATED TEXT RECOGNITION AND TEXT SEARCH WITHIN A GRAPHIC FILE

(75) Inventors: John H. Boose, Bellevue, WA (US); Lawrence S. Baum, Bellevue, WA (US); Molly L. Boose, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 482 days.

(21) Appl. No.: 09/971,149

(22) Filed: Oct. 4, 2001

(65) Prior Publication Data
US 2002/0191848 A1    Dec. 19, 2002

Related U.S. Application Data

(60) Provisional application No. 60/280,315, filed on Mar. 29, 2001.

(51) Int. Cl.
*G06K 9/72* (2006.01)
*G06F 15/00* (2006.01)

(52) U.S. Cl. .................. 382/229; 715/522
(58) Field of Classification Search ........... 382/181
See application file for complete search history.

(56) References Cited

U.S. PATENT DOCUMENTS

| | | | |
|---|---|---|---|
| 5,251,268 A * | 10/1993 | Colley et al. | 382/156 |
| 5,335,290 A * | 8/1994 | Cullen et al. | 382/176 |
| 5,386,508 A | 1/1995 | Itonori et al. | |
| 5,623,679 A | 4/1997 | Rivette et al. | |
| 5,761,328 A | 6/1998 | Solberg et al. | |
| 5,867,596 A | 2/1999 | Kano et al. | |
| 5,895,473 A | 4/1999 | Williard et al. | |
| 5,963,966 A * | 10/1999 | Mitchell et al. | 715/513 |
| 6,134,338 A | 10/2000 | Solberg et al. | |
| 6,260,044 B1 * | 7/2001 | Nagral et al. | 707/102 |
| 6,336,124 B1 * | 1/2002 | Alam et al. | 715/523 |
| 6,442,530 B1 * | 8/2002 | Miller | 705/16 |
| 6,442,691 B1 * | 8/2002 | Blandford | 713/178 |
| 2002/0126990 A1 * | 9/2002 | Rasmussen et al. | 386/68 |

OTHER PUBLICATIONS

Carson et al. "Standards Pipeline: BIIF, VRML and CGM." Computer Graphics, May 1999, pp. 54-60.*

* cited by examiner

*Primary Examiner*—Jingge Wu
*Assistant Examiner*—Charles Kim
(74) *Attorney, Agent, or Firm*—Alston & Bird LLP

(57) ABSTRACT

In accordance with this invention, a method, computer program product, and system for performing automated recognition of blocks of text within a graphic file are provided. The method, computer program product, and system automatically transform drawings into a graphic file format that provides enriched electronic display and text search of the graphic files. The text within large sets of drawings, parts catalogs, and various manuals is automatically discovered, extracted and indexed by the geometric location of the text within the graphic file. Single lines of text and blocks of text are recognized by utilizing geometric reasoning techniques based upon proximity and font characteristics. As such, the present invention automatically produces an interactive electronic representation of a graphic file that allows a user to quickly and accurately search graphic files for particular text, whether the text appears in a single line or over multiple lines in a block of text.

18 Claims, 5 Drawing Sheets

METHOD, COMPUTER PROGRAM PRODUCT, AND SYSTEM FOR PERFORMING AUTOMATED TEXT RECOGNITION AND TEXT SEARCH WITHIN A GRAPHIC FILE

CROSS-REFERENCE TO RELATED APPLICATIONS

This application claims priority from a provisional patent application Ser. No. 60/280,315, filed Mar. 29, 2001, the contents of which are incorporated by reference in their entirety.

FIELD OF THE INVENTION

This invention relates to electronic text recognition in graphic files and, more particularly, to a method, computer program product, and system that provide automated transformation of graphic files into an enriched electronic display permitting automated recognition of blocks of text and the subsequent text search of graphic files.

BACKGROUND OF THE INVENTION

Complex illustrations of large structures or intricate arrangements, such as electrical wiring diagrams, are commonly depicted in paper/hard copy form consisting of multiple pages of drawings. Alternatively, the separate drawings may be depicted in electronic form. The drawings contain large amounts of information regarding each element of the drawing and the corrections and relationships among the elements and among the set of drawings. Some of the information contained in the drawings is explicit, such as labels or other text. Other sources of drawing information are implicit, such as the symbols or configurations.

When a user needs information concerning a relatively small part of the structure or arrangement depicted in the set of drawings, the user must manually search through each page of the large sets of drawings, either on paper or on-line. For example, in industries that depend on complex technical drawings, manuals and parts catalogs for information about its systems, users must manually search many drawings before they can perform maintenance or troubleshoot the system. This typically becomes a lengthy process because the user must study the drawings to determine the way in which the drawings relate to each other and ensure he has all the drawings concerning the particular part of the system at issue. For instance, a wire or circuit from one drawing may be continued on one or more of the other drawings in the set. Similarly, the same circuit breaker may appear on several drawings, implying that wires connected to the circuit breaker on each drawing form a continuous circuit across the drawings. In addition to searching the drawing sets, the user also may have to refer to large parts catalogs or other manuals for more information about a certain element represented in the drawings. Searching the hard copies of the parts catalogs and/or manuals is tedious and time-consuming because of the massive amounts of information they contain. Even if the drawing sets, parts catalogs and/or manuals are on-line, the user nevertheless must repeatedly "pan" and "zoom" to find the exact information that they need.

Once users collect all of the drawings necessary to provide a comprehensive view of the system upon which they plan to work, they must carry the drawings, catalogs and/or manuals with them to perform the work. Otherwise, the user runs the risk of having to repeatedly return to the central repository of the drawings, catalogs and manuals. If the user realizes he needs drawings of another part of the system while working, then he must again commence the lengthy searches described above.

As the above discussion illustrates, the process of manually locating and attaining specific drawings from a large set of drawings for a complex structure or intricate arrangement, such as an electrical wiring diagram, is a daunting task, even for an experienced user. The process gets much more complicated when the user must also obtain all the drawings connected or related to a respective portion of the drawings at issue and/or all the information regarding particular elements within the drawings that is provided by part catalogs or other manuals. For example, finding each occurrence of a particular part number, detail label or text that appears on more than one sheet generally becomes a very lengthy process. Thus, manually searching large sets of drawings for particular parts of a system and obtaining all the drawings and/or information related to that part, is an inefficient, error-prone and expensive endeavor.

The conventional approach to providing users with faster and more accurate access to information contained in large sets of graphic files is based upon manually inserting links and supporting information into an electronic graphic file. In this regard, the conventional approach to electronic graphic text searching begins with converting all legacy electronic or hard copy drawings to an electronic format that will enable functionality to be embedded into the graphics, such as a computer graphics metafile (CGM) format. Once the graphics are properly formatted, the system builder manually re-authors the data in the drawings. To manually re-author the data, the system builder must examine each electronic drawing and manually create hundreds of individual mouse sensitive areas ("hotspots") for each drawing. The multitude of hotspots contain the single lines of text and the blocks of texts within the graphic file. The system builder also must create programs to instruct the system on how to search the text within the graphic files and what to do when the user points at or clicks on each hotspot with his mouse. This approach eventually creates a system for providing users with fast access to text search capabilities for large sets of graphic files, such that the user may find each occurrence of particular text, whether the text is in a single line or spans multiple lines in a text block. Unfortunately, this approach is also inefficient, error-prone and prohibitively expensive because of the significant amount of manual labor required to re-author the graphic files. Thus, electronic information system builders often resist re-authoring graphic files even though the resulting graphic files would provide users with fast and accurate access to information contained in large sets of drawings, parts catalogs and/or manuals.

For the reasons discussed above, there exists a need for a system that processes complex graphic files to provide users with fast and accurate access to information contained in large sets of drawings, parts catalogs and/or manuals. More particularly, the need is for a system that efficiently recognizes text so as to support enhanced text searching functionality.

SUMMARY OF THE INVENTION

In accordance with this invention, a method, computer program product, and system for performing automated recognition of blocks of text within a graphic file are provided. The method, computer program product, and system automatically transform drawings into a graphic file format that provides enriched electronic display and text search of the graphic files. The text within a graphic file representing, for example, large sets of drawings, parts catalogs, and various manuals is automatically discovered, extracted and indexed by the geometric location of the text within the graphic file. Single lines of text and blocks of text are automatically recognized by utilizing geometric reasoning techniques based upon the proximity and font characteristics of the text. As such, the present invention automatically produces an interactive electronic representation of a graphic file that allows a user to quickly and accurately search graphic files for particular text, whether the text appears in a single line or over multiple lines in a block of text. The present invention is advantageous because it does not require the user to manually search through large drawing sets, parts catalogs or other manuals for particular text. Moreover, the present invention does not require the system builder to manually re-author electronic graphic files. Therefore, the present invention creates and performs automated recognition of blocks of text within a graphic file that completely avoids the time-consuming, inexact, and expensive steps of the conventional approaches. Instead, the present invention provides an efficient and accurate approach to automatically searching for particular text located in large drawing sets, parts catalogs or other manuals.

In one embodiment of the present invention, the method, computer program product, and system enable text search within complex graphic files by automatically constructing a computer readable object defining the position and content of related text segments, which form a block of related text. The computer readable object is constructed by automatically analyzing a graphic file representation of text formatted such that the graphic file representation includes instructions defining the position and content of all text segments within the graphic file. For example, the graphic file representation of text may be formatted in any vector graphic format, such as computer graphic metafile (CGM) format.

Once the graphic file representations of text are formatted to include instructions defining the position and content of all text segments, the instructions are automatically analyzed to identify related text segments. The method, computer program product, and system of one embodiment of the present invention may identify related text segments on adjacent or different lines of text when automatically analyzing the instructions. The related text segments comprise the blocks of related text that are included in the automatically constructed computer readable object, which is used to provide an accurate and fast text search. The automatic analyzing of the graphic file representations of text and the automatic recognition of blocks of related text preclude the tedious, time-consuming, and expensive re-authoring tasks for system builders who otherwise would have to manually record the content and position of all the blocks of text into the graphic files.

Other embodiments of the present invention may also incorporate geometric reasoning techniques based upon the proximity and/or font characteristics of the text segments to identify related text segments when automatically analyzing the graphic file representation of text. The geometric reasoning techniques based upon the proximity and font characteristics of the text provide approaches to determine the geometric extent of individual lines of text and/or an entire block of related lines when the instructions contained in the graphic file representation regarding content and position are not explicit. Thus, a computer readable object defining the position and content of related text segments is automatically constructed from the estimates provided by the geometric reasoning techniques based upon the proximity and font characteristics of the text segments. This embodiment of the present invention farther simplifies the tasks of a system builder because the computer readable objects are nevertheless automatically constructed even if the graphic file representations of text do not contain explicit instructions regarding the position and content of all text segments.

Another embodiment of the method, computer program product, and system of the present invention for automatically recognizing blocks of text within a graphic file may also provide for constructing a block surrounding the block of related text that is highlighted upon selection of text elements in the block. In addition, the instructions in each graphic file representation of text may include the text and the definition of a boundary block surrounding each text segment. Thus, while automatically constructing the computer readable object, the block surrounding the block of related text may be constructed by summing the extents of the blocks surrounding the related text segments. The highlighted block surrounding the block of related text provides for representation of selected text during a text search such that it is clear to the user that the selected text has the text segment for which the user searched. The method of automatically constructing the block from the blocks surrounding the related text segments saves time and money for an automated graphic file text search system builder because the system builder does not need to define a block surrounding the related text separately.

Thus, the graphic file text recognition method, computer program product, and system of the present invention provide for automatically recognizing blocks of text within graphic file representations of text. The automatic recognition that certain lines of text are related and form a block of text enable text search of graphic files for phrases that span more than a single line of text. The features of the various embodiments of the present invention provide users and electronic graphic text search system builders with automated recognition of blocks of text in graphic files. Therefore, the present invention avoids the time-consuming and expensive steps of conventional approaches and, instead, provides an efficient and accurate approach to searching large drawing sets for particular text.

BRIEF DESCRIPTION OF THE DRAWINGS

Figure 1:
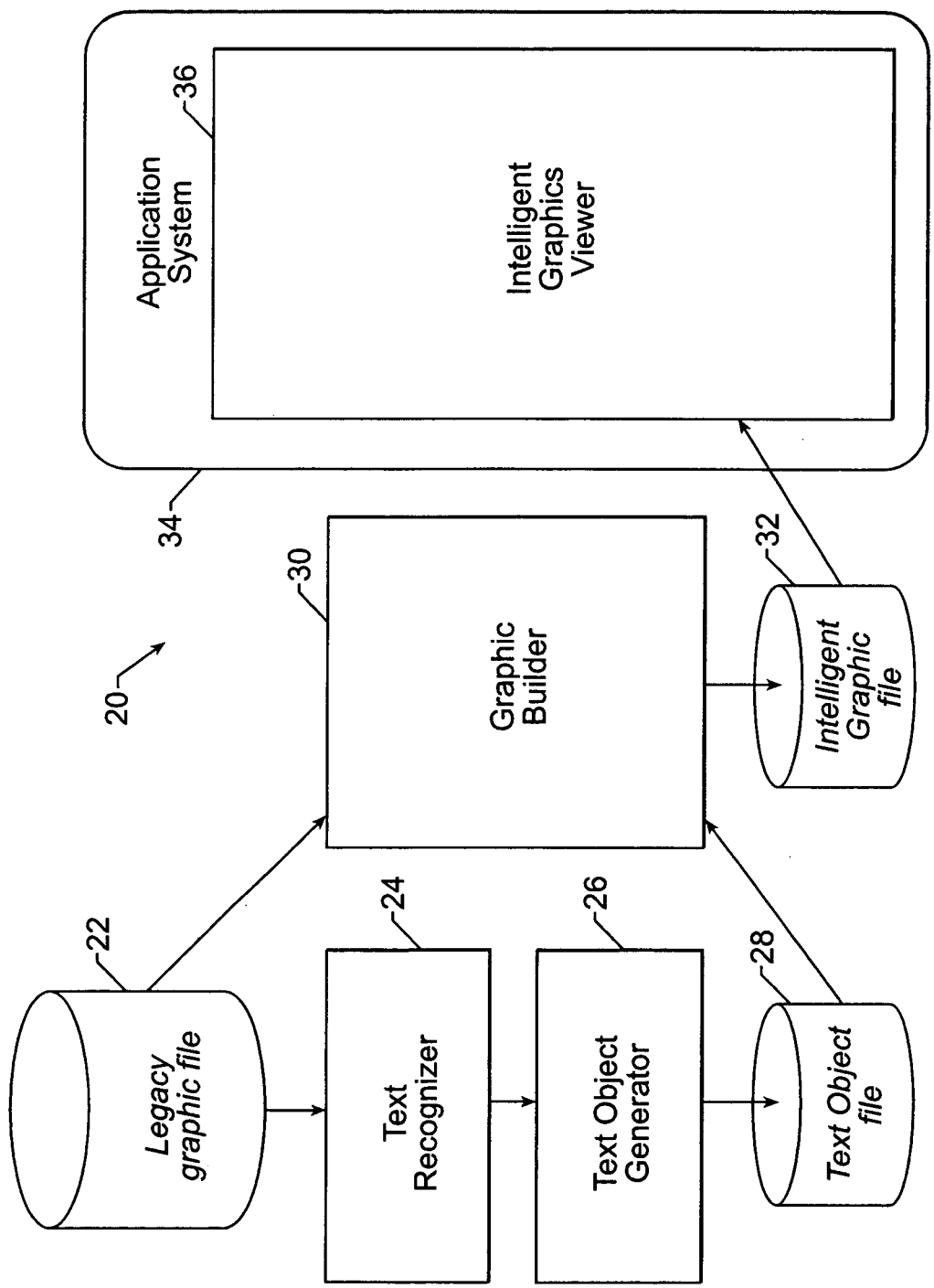
Figure 2:
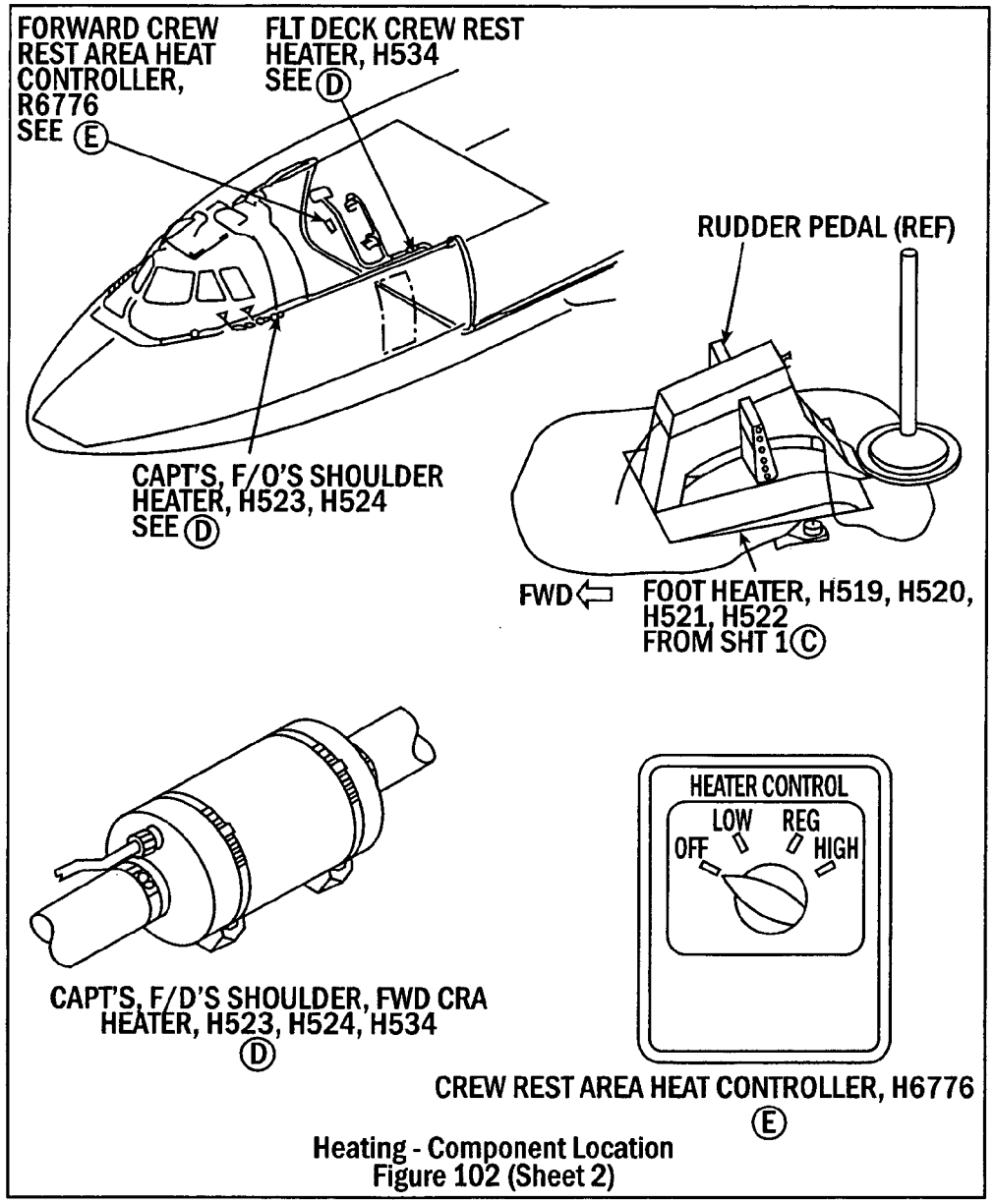
Figure 3:
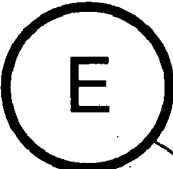
Figure 4:
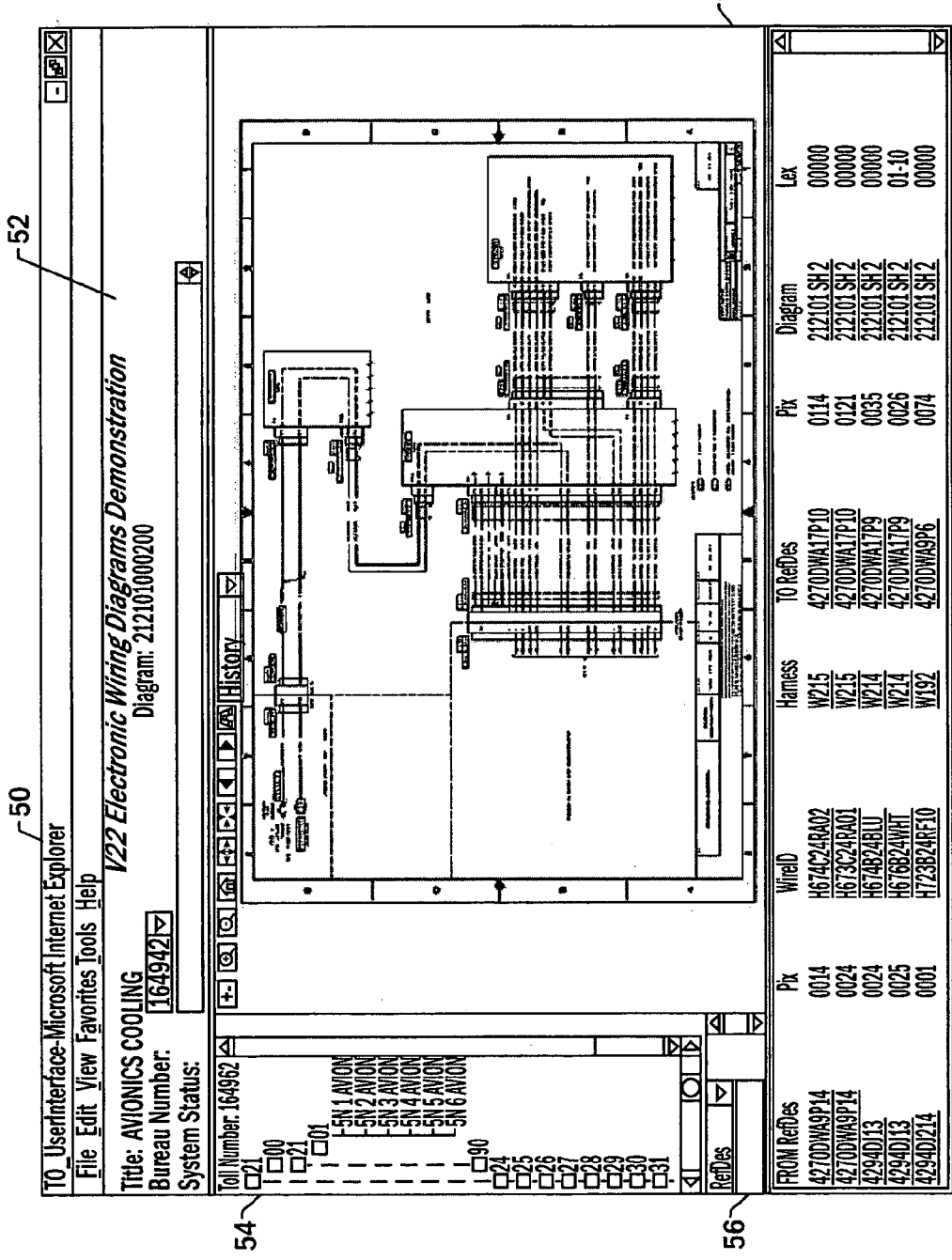
Figure 5:
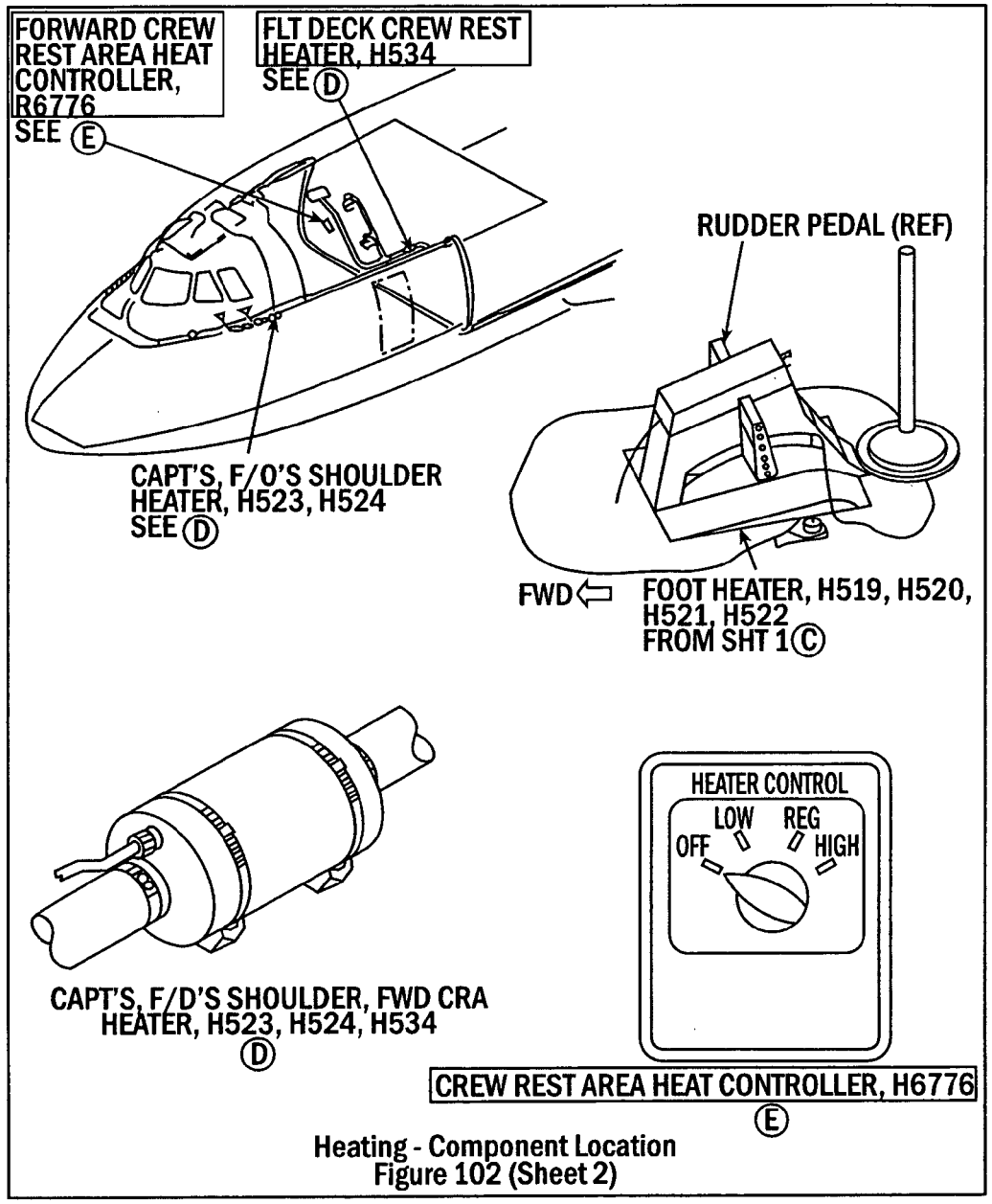

Having thus described the invention in general terms, reference will now be made to the accompanying drawings, which are not necessarily drawn to scale, and wherein:

FIG. 1 is a block diagram illustrating the operations performed by the method, computer program product, and system of one embodiment of the present invention;

FIG. 2 is a typical electronic representation of a graphic containing graphic file representations of text that is analyzed by the method, computer program product, and system of one embodiment of the present invention;

FIG. 3 is a magnified view of a portion of FIG. 2 depicting a graphic file representation of text;

FIG. 4 is a representative display, provided by the application system, of the intelligent graphic explorer that contains the intelligent graphic viewer display and enables the user to view, navigate among and search the text within a graphic or set of graphics according to the method, computer program product, and system of one embodiment of the present invention; and FIG. 5 is the graphic of FIG. 2 depicted after a text search of the phrase "CREW REST," conducted according to the method, computer program product, and system of one embodiment of the present invention, highlights three areas of text, including the text block where "CREW" and "REST" appear in different lines of text.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with this invention, a method, computer program product, and system for performing automated recognition of blocks of text within a graphic file are provided. The method, computer program product, and system automatically transform drawings into a graphic file format that provides enriched electronic display and supports enhanced text search functionality. The text within a graphic file representing, for example, large sets of drawings, parts catalogs, and various manuals may be automatically discovered, extracted and indexed by the geometric location of the text within the graphic file. Single lines of text and blocks of text may be recognized by utilizing geometric reasoning techniques based on the proximity and font characteristics of the text. As such, the present invention automatically produces an interactive electronic representation of a graphic file that allows a user to quickly search graphic files for particular text, whether the text appears in a single line or over multiple lines in a block of text. Therefore, the present invention provides an efficient and accurate approach to automatically searching for particular text located in graphic files representing, for example, large drawing sets, parts catalogs or other manuals.

FIG. 1 is a block diagram illustrating the operations performed by the method, computer program product, and system 20 of one embodiment of the present invention. The legacy graphic file 22 is an electronic representation of the original drawing or set of drawings and text. For example, the legacy graphic file 22 may represent the complex drawings of large structures or intricate arrangements containing both graphics and text. The drawings are commonly provided in paper/hard copy form, scanned paper images or other electronic graphic files, such as raster or vector graphic files. Before the operations depicted in FIG. 1 may commence, however, the drawings must be converted to an interactive format, such as a format that may enable functionality to be embedded in the graphic. One type of interactive format is a vector graphic format, for example a computer graphics metafile (CGM) format. The legacy drawings may be converted to an interactive format by any available method known to those skilled in the art.

Once the graphic files are in a proper graphic format with graphic representations of text, depicted by the legacy graphic file 22 of FIG. 1, the legacy graphic file 22 is reviewed by the text recognizer 24. FIG. 2 is a display of a typical electronic representation of a graphic file containing graphics and text. FIG. 3 is a magnified view of the upper left-hand corner of the display in FIG. 2. Below is an example of a vector graphic representation of text from the legacy graphic file 22 in CGM format for the text of FIG. 3:

---
RestrText 770 69 1770 9810 final "FORWARD CREW";
RestrText 894 69 1770 9682 final "REST AREA HEAT";
RestrText 706 69 1770 9554 final "CONTROLLER,";
RestrText 322 69 1770 9426 final "M6776";

--- wherein each row describes the geometric location of one text segment, i.e., one line of text, within the graphic file. For the first row, "RestrText" indicates that the text is located within a specified text box. "770" and "69" are the width and height of the text box, respectively. "1770" and "9810" are the "X" and "Y" addresses, respectively, of a predefined text box corner, such as the lower left-hand corner. "final" indicates the end of the text box parameters and "FORWARD CREW" is the content of the text box.

In one embodiment of the present invention, the text recognizer 24 reviews the legacy graphic file 22 to discover and extract the text contained in the graphic. The text recognizer 24 recognizes not only individual lines of text, but also blocks of text. As shown in the example above, each text segment appears as a separate line in the legacy graphic file 22. Thus, what is perceived by the user to be a block of text in FIG. 3 is depicted in legacy graphic file 22 as separate text segments. The text recognizer 24 then may utilize geometric reasoning techniques based on the proximity and font characteristics of the text to recognize which separate text segments in the legacy graphic file 22 form blocks of text. The geometric reasoning techniques refer to the geometric location parameters provided by the graphic representations of text in the legacy graphic file 22, as well as other common characteristics of the text, such as font or the like.

For example, the text recognizer 24 may analyze the graphic file of the display in FIG. 2 to recognize the individual text segments. The text recognizer 24 then may utilize proximity-based geometric reasoning techniques to analyze the individual text segment parameters and discover that all of the text segments included in the portion of the graphic file in FIG. 3 have the same "X" address for the corner of their text boxes and that the "Y" addresses are spaced a close and equal distance apart. The same "X" addresses indicate to the text recognizer 24 that the corners of the text boxes for the particular text segments line up somewhere on the graphic. Close and equal spacing between the "Y" addresses of the corners of the text boxes reveals to the text recognizer 24 that the equally spaced text segments are located in the same area of the graphic. For the example of the legacy graphic file 22 in CGM format for the text of FIG. 3 as shown above, all of the text segments have the same "X" address for their text boxes (1770) and the distance between the "Y" addresses of their text boxes are all 128 (9810−9682=128; 9682−9554=128; etc.). In addition, the text recognizer 24 may utilize font characteristic-based geometric reasoning to analyze the text segments and further assess whether the text segments are likely part of a block of text. In this regard, if the font characteristics of the text segments that are in close proximity to each other are similar or the same, then that further indicates that the text segments are part of one text block. For the example of the legacy graphic file 22 in CGM format for the text of FIG. 3 as shown above, all of the text segments have the same text box height (69). The text box height is indicative of the height of the text within the box, thus, the same text box height is further evidence to the text recognizer 24 that the text segments are part of one text block. Therefore, in the example provided above, the text recognizer 24 discovers that the separate text segments in the graphic file for text of FIG. 3 form one block of text. While examples of geometric reasoning based on proximity and font characteristics by the text recognizer 24 are provided above, the text recognizer 24 may utilize other geometric reasoning techniques, if so desired. In addition, the text recognizer 24 may be configured to analyze a wide variety of characteristics of the text depending upon the type of text and the common characteristics shared by a block of text in the particular application.

Once the text recognizer 24 discovers all of the lines and blocks of text within a legacy graphic file 22, the text object generator 26 creates a text object file 28 containing all of the information regarding the discovered text. The text object generator 26 may create one text object file 28 for each original legacy graphic file 22, although the text object file 28 may dissect or combine the original legacy graphic file 22 in other ways, if desired. The format of the text object file 28 may be any computer readable format, for example a markup format, such as extensible markup language (XML) format.

In one embodiment of the method, computer program product, and system 20 of the present invention, the text object generator 26 creates a text object file 28 containing object elements for the text. Each object element may contain the text, such as a single character, a word, a line, or a block of text, and the geometric extent of a boundary of that text. The object elements also may contain "hotspot" instructions for the text. A hotspot defines an area surrounding the text that is visually emphasized when certain actions occur, such as when a mouse brushes over the text or the text is selected either by the user or as the result of a text search. For example, the text object generator 26 may create a hotspot for the text of FIG. 3 by defining the boundary surrounding the text block to be highlighted when certain actions occur. The text object generator may determine the boundary surrounding the text block by summing the extents of the boxes surrounding the individual text segments of the text block as recognized by the text recognizer 24. For example, the boundary surrounding the text block may be the box formed by the top of the box containing the top text segment, the bottom of the box containing the bottom text segment and the right and left sides of all the text segment boxes. Below is an example of an XML format text object file for the text of FIG. 3:

---

<para id="P2" hslistid="HS1" text="FORWARD
CREW REST AREA HEAT CONTROLLER, M6776">
FORWARD CREW REST AREA HEAT CONTROLLER, M6776
</para>
<hslist id="HS1">
<hotspot>
<rect id="Rect1" left="1760" top="9894" width="894" height="453">
</rect></hotspot></hslist>

--- wherein the terms located between the "<para . . . " and "</para>" indicate the text contained in the object (FORWARD CREW REST AREA HEAT CONTROLLER, M6776) and a unique hotspot identifier (HS1). The terms located between the "<hslist . . . " and "</hslist>" contain the list of hotspots, in this example only one exists (HS1). The terms located between "<hotspot . . . " and "</hotspot>" also contain the parameters (left, top, width, and height) for the boundary surrounding the text block that may be highlighted.

Further explanation of at least some of the foregoing features of the method, computer program product, and system 20 of the present invention described above may be found in U.S. patent application Ser. No. 09/615,499, entitled Intelligent Wiring Diagram System, filed on Jul. 13, 2000, and issued on Aug. 12, 2003 as U.S. Pat. No. 6,606,731, the contents of which are incorporated herein by reference in their entirety.

One advantageous embodiment of the method, computer program product, and system 20 of the present invention provides that a graphic builder 30, depicted in FIG. 1, merge the information from the text object file 28 and the legacy graphic file 22 to form an intelligent graphic file 32. The format of the intelligent graphic file 32 may be any interactive format, such as a format that may enable embedding data from the text object file 28 into the legacy graphic file 22. One type of interactive format is a vector graphic format, for example a computer graphics metafile (CGM) format. The intelligent graphic file 32 may contain application program structures to embed the data from the text object file 28 into the legacy graphic file 22. The application program structures also contain the hotspot instructions included in the object element of the text object file 28 and may contain additional instructions regarding features that are embedded into the legacy graphic file 22. For instance, application program structures contain instructions regarding the manner in which the boundary surrounding the text defined in the object element is highlighted and when the highlighting occurs.

The instructions and information contained in the application program structures of the intelligent graphic file 32 may enable quick and accurate graphic searches for particular text and highlighted views of the text search results in one embodiment of the present invention. In this regard, a user may view a graphic or set of graphics and perform a text search that discovers each location of the particular text in the graphic or graphics. The method, computer program product, and system 20 of the present invention then provide for the results of the text search to be automatically displayed in a manner described below. The viewing of a graphic or set of graphics and the text search results within the graphic or graphics and the selecting of particular text are generally provided by an intelligent graphics viewer 36. The intelligent graphics viewer 36 may be part of an application system 34, as depicted in FIG. 1. The application system 34 also may contain databases with all of the information about the graphic set and may provide the user with the ability to turn on or off any of the automated features. For example, in one embodiment of the present invention, the application system 34 may contain databases with information from parts catalogs or other manuals regarding the parts depicted in the graphics. Further details regarding including associated parts manuals or other information contained by the application system is provided in U.S. patent application Ser. No. 09/971,155 entitled The Method, Computer Program Product, and System for Creating and Viewing an Intelligent Graphics File Including Parts Information, filed concurrently herewith, and issued on Jul. 20, 2004 as U.S. Pat. No. 6,766,331, the contents of which are incorporated herein by reference in their entirety. In another embodiment of the present invention, the application system 34 may also contain the information necessary for automated linking between graphics. Further details regarding automated linking between graphics is provided in U.S. patent application Ser. No. 09/971,283 entitled The Method, Computer Program Product, and System for Performing Automated Linking Between Sheets of a Drawing Set, filed concurrently herewith, the contents of which are incorporated herein by reference in their entirety.

FIG. 4 is a representative display provided by the application system 34. The application system 34 may provide an intelligent graphic explorer 50 that may embody the intelligent graphic viewer 36 according to the method, computer program product, and system of one embodiment of the present invention. The intelligent graphic explorer 50 of FIG. 4 may enable the user to view, navigate among, and search the text of graphics. The intelligent graphic explorer 50 may present a display that may be configured in any form. For example, in FIG. 4, the intelligent graphic explorer 50 is configured so that the top section of the display may depict the system and graphic information 52 that may be provided by databases in the application system 34. The section on the left of the display may show the table of contents 54 and the search function 56 for the graphic sets or other information that may be provided by databases in the application system 34. The section at the bottom of the display may present a scrollable and searchable portion 58 of a database, such as a parts and/or maintenance manual associated with the graphic on display, as described above. The intelligent graphics viewer display 60, which is part of the intelligent graphic viewer 36, is embedded within the intelligent graphic explorer 50 and creates the portion of the display shown in FIG. 4 to be located to the right of the table of contents 54 and, in this example, is displaying graphic depicting a portion of an electrical wiring diagram. The electrical wiring diagram graphic illustrates the types of complex technical graphics that are particularly difficult to search by visual inspection. The automatic recognition and recording of text, which provides the accurate and efficient text searching of one embodiment of the present invention, is especially useful when searching for text within these complex graphics.

As stated above, the intelligent graphic explorer 50 may present a display that may be configured in any form. The user may choose to add or remove any of the sections of FIG. 4, described above. In addition, to perform the text search functions, the user may choose to add a text search section to the intelligent graphic explorer 50. Embodiments of the present invention may, for example, permit inclusion of a section within the intelligent graphic explorer 50 that is dedicated to text searching, such as the search function 56 section of FIG. 4. Other embodiments of the present invention may include the text search commands within a "pull-down" menu in the intelligent graphic explorer 50 or any other suitable configuration. Embodiments of the present invention may also allow the user or system 20 to choose other features to add or remove from any of the sections within the intelligent graphics explorer 50, such as whether the intelligent graphics viewer display 60 presents a magnified view of the results of the text search or not.

When a user selects a graphic or graphic set within which to search for particular text, the intelligent graphic viewer 36 in one embodiment of the present invention loads the graphic or graphic set and finds the information and instructions contained in the all of the application program structures of the intelligent graphic file 32 for that graphic or set of graphics. The viewer 36 then may build an array structure for each object element within the application program structures. The array structures may contain the character, word, line or block of text, the "X" and "Y" coordinates for the corners of the boundary surrounding the text, and the instructions, such as the manner in which to display the text found in a text search or the like. Below is an example of an array structure built by the viewer 36 for an application program structure in the intelligent graphic file 32 containing information regarding the text block depicted in FIG. 3:

| LayerID | X1 | Y1 | X2 | Y2 | Text |
|---------|------|------|------|------|------|
| PARA P2 | 1761 | 9432 | 2673 | 9903 | "FORWARD CREW REST AREA HEAT CONTROLLER, M6676" | wherein "PARA P2" is the label for the instructions contained in the application program structure, such as the manner in which to display the text found in a text search or the like. The coordinates under the headings "X1," "Y1," "X2," and "Y2" define the boundary of the box surrounding the text, which the viewer may magnify, if so desired. The text segment under the heading "text" is the text that is searched by the viewer 36 when instructed to perform a text search.

When the viewer 36 is asked to perform a text search, it searches through the text fields in the array structures and, if it finds the particular text, it carries out the instructions, such as displaying the portion of the graphic that includes the selected text and highlighting the boundary and text within the boundary. The process described above may be repeated until each occurrence of the particular text in the graphic or graphic set is found and displayed by the viewer 36. Thus, the intelligent graphics viewer display 60 may present the results of the text search according to the instructions in the application program structures and, therefore, the array structures. The intelligent graphics viewer display 60 also presents the results of the text search according to the user or system 20 options available via the intelligent graphic explorer 50, such as whether to present a magnified display of the results. For example, if the user or system 20 directed the intelligent graphic viewer 36 to magnify the text search results in the intelligent graphics viewer display 60, the intelligent graphics viewer 36 uses the "X" and "Y" coordinates in the array structure to magnify that portion of the graphic depicting the block containing the selected text. If the text search results include more than one area in the graphic where the particular text occurs, the intelligent graphics viewer 36 may construct a boundary that includes the boundaries of all the text results and magnifies that portion of the graphic. If the text search results include more than one graphic where the particular text occurs, the intelligent graphics viewer 36 may display one graphic in which the particular text was found and a list of links to other graphics in which the particular text was also found or any other manner known in the industry to indicate on the display that other graphics also contain the particular text.

FIGS. 2 and 5 illustrate the graphical text search procedure of one embodiment of the method, computer program product, and system of the present invention. The user may select the graphic of FIG. 2 or the set of graphics containing the graphic of FIG. 2, which may direct the system 20 to load the graphic or graphics into the intelligent graphics viewer 36. The intelligent graphic viewer 36 finds the application program structures for the graphic of FIG. 2 and builds array structures that contain the information and instructions for the text within FIG. 2. If the intelligent graphic viewer 36 is requested to search the graphic of FIG. 2 for the text "CREW REST," the viewer 36 searches all of the array structures to find all the areas in the graphic where "CREW REST"

appears. When the intelligent graphics viewer 36 finds the text "CREW REST" in the array structures, the viewer 36 then looks to and carries out the instructions for that text and presents the results via the intelligent graphics viewer display 60. FIG. 5 depicts the results of the "CREW REST" text search for the graphic of FIG. 2. The intelligent graphic viewer 36 found three occurrences of the text "CREW REST" within the graphic and carried out the instruction to highlight the boundaries surrounding each line or block of text containing "CREW REST." Thus, in FIG. 5, the intelligent graphic viewer highlighted the block of text in which "CREW" and "REST" appear in different lines in addition to the block of text in which "CREW REST" appears in the same line, and the line of text containing "CREW REST."

The ability to find "CREW REST" although "CREW" and "REST" appear in different lines demonstrates the advantages of the present invention over the conventional methods of searching for text within a graphic file, which would not detect the text on different lines as being part of the same block of text and, thus, would not provide accurate text search results. The graphic text search of the present invention therefore enables accurate and efficient text searching of graphic files that otherwise would have to be visually searched for particular text by a user, which is a time-consuming and error prone process whether the user has paper/hardcopy drawings or electronic representations that must be manually and repeatedly "panned" and "zoomed." In addition, the automatic recognition of text, particularly the text that is part of a block of text, and automatic embedding of the data regarding text into the graphic file saves time and money for a text search system builder who otherwise would have to manually determine which text is part of a text block and manually embed all the text information into the graphic file.

The system 20 of the present invention and, in particular, the text recognizer 24, the text object generator 26, the graphic builder 30, the application system 34, and the intelligent graphics viewer 36, are typically embodied by a processing element and an associated memory device, both of which are commonly comprised by a computer or the like. As such, the system of the present invention generally operates under control of a computer program product to provide the functionality described hereinabove in conjunction with the various components of the system, according to another aspect of the present invention. The computer program product for performing the contingent claim valuation includes a computer-readable storage medium, such as the non-volatile storage medium, and computer-readable program code portions, such as a series of computer instructions, embodied in the computer-readable storage medium.

In this regard, FIG. 1 is a block diagram and flowcharts of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Thus, the graphic file text recognition method, computer program product, and system of the present invention provide for automatically recognizing blocks of text within graphic file representations of text. The automatic recognition that certain lines of text are related and form a block of text enable text search of graphic files for phrases that span more than a single line of text. The features of the various embodiments of the present invention provide users and electronic graphic text search system builders with automated recognition of blocks of text in graphic files. Therefore, the present invention avoids the time-consuming and expensive steps of conventional approaches and, instead, provides an efficient and accurate approach to searching large drawing sets for particular text.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of recognizing blocks of text within a graphic file comprising:

providing a graphic file representation of text wherein the graphic file representation comprises a plurality of instructions defining a position and content of respective text segments and further defining a boundary surrounding respective text segments;

analyzing the plurality of instructions to identify related text segments;

constructing a computer readable object defining a position and content of a plurality of related text segments to thereby define a block of related text, wherein constructing the computer readable object comprises defining a boundary surrounding the block of related text that is highlighted upon selection of text elements in the boundary, wherein constructing the computer readable object further comprises constructing the boundary surrounding the block of related text by summing the boundaries surrounding the related text segments;

merging the computer readable object with a portion of the graphic file to form an intelligent graphic file; and creating a plurality of searchable array structures from the intelligent graphic file, each array structure associated with a different block of text and including the text, a definition of the boundary surrounding the respective block of text and instructions associated with display of the block of text.

2. A method according to claim 1, wherein providing the graphic file representation comprises providing a graphic file representation having a vector graphic format.

3. A method according to claim 1, wherein analyzing further comprises identifying related text segments by proximity.

4. A method according to claim 1, wherein analyzing further comprises identifying related text segments by font characteristics.

5. A method according to claim 1, where each text segment appears on a different line, and wherein analyzing further comprises identifying related text segments on different lines.

6. A method according to claim 1 wherein constructing the computer readable object further comprises constructing the computer readable object to include hotspot instructions associated with the block of related text to cause the block of related text to be visually emphasized, wherein the hotspot instructions include instructions to define the boundary surrounding the block of related text.

7. A computer program product for recognizing blocks of text within a graphic file, the computer program product comprising a computer-readable storage medium having computer-readable program code portions stored therein, the computer-readable program code portions comprising:
a first executable portion configured for providing a graphic file representation of text wherein the graphic file representation comprises a plurality of instructions defining a position and content of respective text segments and further defining a boundary surrounding respective text segments;
a second executable portion configured for analyzing the plurality of instructions to identify related text segments;
a third executable portion configured for constructing a computer readable object defining a position and content of a plurality of related text segments to thereby define a block of related text, wherein said third executable portion is also capable of defining a boundary surrounding the block of related text that is highlighted upon selection of text elements in the boundary, wherein said third executable portion is further capable of constructing the boundary surrounding the block of related text by summing the boundaries surrounding the related text segments;
a fourth executable portion configured for merging the computer readable object with a portion of the graphic file to form an intelligent graphic file; and
a fifth executable portion configured for creating a plurality of searchable array structures from the intelligent graphic file, each array structure associated with a different block of text and including the text, a definition of the boundary surrounding the respective block of text and instructions associated with display of the block of text.

8. A computer program product according to claim 7, wherein said first executable portion is also configured for providing a graphic file representation having a vector graphic format.

9. A computer program product according to claim 7, wherein said second executable portion is also configured for identifying related text segments by proximity.

10. A computer program product according to claim 7, wherein said second executable portion is also configured for identifying related text segments by font characteristics.

11. A computer program product according to claim 7, wherein each text segment appears on a different line, and wherein said second executable portion is also configured for identifying related text segments on different lines.

12. A computer program product according to claim 7 wherein said third executable portion is further configured for constructing the computer readable object to include hotspot instructions associated with the block of related text to cause the block of related text to be visually emphasized, wherein the hotspot instructions include instructions to define the boundary surrounding the block of related text.

13. A system for recognizing blocks of text within a graphic file comprising:
a memory device for storing a graphic file representation of text wherein the graphic file representation comprises a plurality of instructions defining a position and content of respective text segments and further defining a boundary surrounding respective text segments; and
a processing element configured for analyzing the plurality of instructions to identify related text segments, said processing element also configured for constructing a computer readable object defining a position and content of a plurality of related text segments to thereby define a block of related text, wherein said processing element is further configured for defining a boundary surrounding the block of related text that is highlighted upon selection of text elements in the boundary, wherein said processing element is further configured for constructing the boundary surrounding the block of related text by summing the boundaries surrounding the related text segments, said processing element further configured for merging the computer readable object with a portion of the graphic file to form an intelligent graphic file, said processing element also configured for creating a plurality of searchable array structures from the intelligent graphic file with each array structure associated with a different block of text and including the text, a definition of the boundary surrounding the respective block of text and instructions associated with display of the block of text.

14. A system according to claim 13, wherein said memory element also stores a graphic file representation having a vector graphic format.

15. A system according to claim 13, wherein said processing element is further configured for identifying related text segments by proximity.

16. A system according to claim 13, wherein said processing element is further configured for identifying related text segments by font characteristics.

17. A system according to claim 13, wherein each text segment appears as a different line, and wherein said processing element is further configured for identifying related text segments on different lines.

18. A system according to claim 13 wherein said processing element is also configured for constructing the computer readable object to include hotspot instructions associated with the block of related text to cause the block of related text to be visually emphasized, wherein the hotspot instructions include instructions to define the boundary surrounding the block of related text.

* * * * *